(12) United States Patent
Hottinen et al.

(10) Patent No.: US 6,754,286 B2
(45) Date of Patent: *Jun. 22, 2004

(54) TRANSMIT DIVERSITY METHOD AND SYSTEM

(75) Inventors: Ari Hottinen, Espoo (FI); Risto Wichman, Espoo (FI)

(73) Assignee: Nokia Corporation, Espoo (FI)

( * ) Notice: Subject to any disclaimer, the term of this patent is extended or adjusted under 35 U.S.C. 154(b) by 222 days.

This patent is subject to a terminal disclaimer.

(21) Appl. No.: 09/741,135

(22) Filed: Dec. 18, 2000

(65) Prior Publication Data

US 2002/0009156 A1 Jan. 24, 2002

Related U.S. Application Data

(63) Continuation of application No. PCT/EP00/01127, filed on Feb. 11, 2000, which is a continuation of application No. PCT/EP99/03440, filed on May 19, 1999.

(51) Int. Cl.[7] .............................................. H04L 27/20
(52) U.S. Cl. ....................... 375/299; 375/267; 375/358; 455/101
(58) Field of Search .............................. 375/267, 347, 375/358, 299; 455/101, 103

(56) References Cited

U.S. PATENT DOCUMENTS

| | | | |
|---|---|---|---|
| 5,128,965 A | | 7/1992 | Henrikkson |
| 6,067,324 A | * | 5/2000 | Harrison ..................... 375/267 |
| 6,131,016 A | * | 10/2000 | Greenstein et al. ............ 455/69 |
| 6,373,832 B1 | * | 4/2002 | Huang et al. ................ 370/342 |
| 6,584,161 B2 | * | 6/2003 | Hottinen et al. ............. 375/299 |

FOREIGN PATENT DOCUMENTS

| | | | |
|---|---|---|---|
| EP | 0755127 A1 | * | 1/1997 |
| EP | 0 755 127 | | 1/1997 |
| EP | 0 807 989 A1 | | 11/1997 |
| EP | 0966125 A1 | * | 12/1999 |
| GB | 2 324 932 | | 11/1998 |
| WO | WO 01/78254 A1 | * | 10/2001 |

OTHER PUBLICATIONS

Andoh, et al., "Channel Estimaton Using Time Multiplexed Pilot Symbols for Coherent Rake Combining for DS–CDMA Mobile Radio", *Personal, Indoor and Mobile Radio Communications*, 8th IEEE Intl Symposium, vol. 3, pp. 954–958 (Sep. 1997).

Hottinen, et al., "Transmit Diversity by Antenna Selection in CDMA Downlink", *IEEE 5th International Symposium on Spread Spectrum Techniques and Applications*, vol. 3, pp. 767–770 (Sep. 1998).

* cited by examiner

*Primary Examiner*—Temesghen Ghebretinsae
(74) *Attorney, Agent, or Firm*—Squire, Sanders & Dempsey L.L.P.

(57) ABSTRACT

The invention relates to a transmit diversity method for a wireless communication system comprising a transmitting element and at least one receiver, wherein a transmission signal is transmitted from the transmitting element to the at least one receiver in accordance with a weight information determined in response to a feedback information. The feedback information is derived from the response at the at least one receiver to the transmission signal, and is fed back using multiplexed feedback signals. Alternatively, the weight information may be determined at the transmitting element by filtering said feedback information and quantizing the filtered feedback information to a desired quantization constellation. Thus, multiple quantization constellations and combinations thereof and/or constellation specific feedback subchannels can be used for channel probing, such that the total feedback resolution can be enhanced, while maintaining low signaling capacity of the feedback channel.

62 Claims, 4 Drawing Sheets

| mode | $N_{FB}$ | $N_W$ | feedback bit rate | Na | Np |
|---|---|---|---|---|---|
| STD | 1 | 1 | 1500bps | 1 | 0 |
| TxAA mode 1 | 1 | 2 | 1500bps | 0 | 2 |
| TxAA mode 2 | 1 | 4 | 1500bps | 1 | 3 |

| feedback value | $P_{A1}$ | $P_{A2}$ |
|---|---|---|
| 0 | 0 | 1 |
| 1 | 1 | 0 |

| feedback value | phase diff. |
|---|---|
| 0  0 | 180° |
| 0  1 | -90° |
| 1  1 | 0° |
| 1  0 | 90° |

Fig. 3A  Fig. 3B

| ampl. bit | $P_{A1}$ | $P_{A2}$ |
|---|---|---|
| 0 | 0.2 | 0.8 |
| 1 | 0.8 | 0.2 |

| phase bits | | | phase diff. |
|---|---|---|---|
| 0 | 0 | 0 | 180° |
| 0 | 0 | 1 | -135° |
| 0 | 1 | 1 | -90° |
| 0 | 1 | 0 | -45° |
| 1 | 1 | 0 | 0° |
| 1 | 1 | 1 | 45° |
| 1 | 0 | 1 | 90° |
| 1 | 0 | 0 | 135° |

Fig. 3C

| phase bits (slots S1) | | phase difference |
|---|---|---|
| 0 | 0 | 180° |
| 0 | 1 | -90° |
| 1 | 1 | 0° |
| 1 | 0 | 90° |

| phase bits (slots S2) | | phase difference |
|---|---|---|
| 0 | 0 | -135° |
| 0 | 1 | -45° |
| 1 | 1 | 45° |
| 1 | 0 | 135° |

Fig. 4

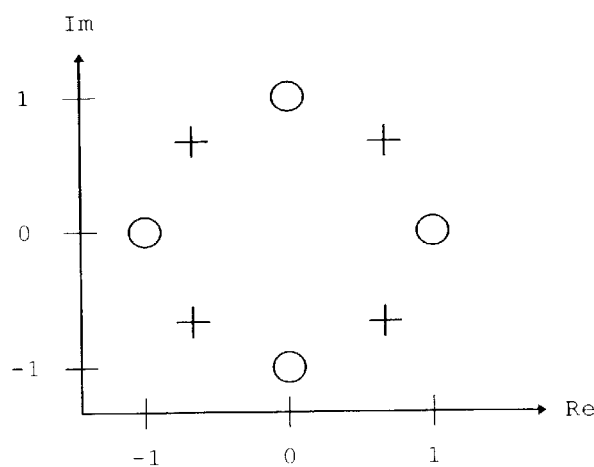
Fig. 6
| phase bit ($S_{odd}$) | phase difference |
|---|---|
| 0 | 180° |
| 1 | 0° |
| phase bit ($S_{even}$) | phase difference |
|---|---|
| 0 | -90° |
| 1 | +90° |
Fig. 7
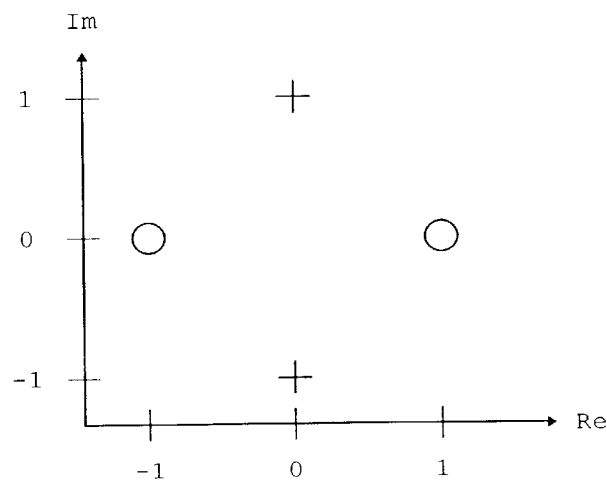
Fig. 8

TRANSMIT DIVERSITY METHOD AND SYSTEM

This application is a continuation of PCT/EP00/01127 filed Feb. 11, 2000 which is a continuation of PCT/EP99/03440 filed May 19, 1999.

FIELD OF THE INVENTION

The present invention relates to a transmit diversity method and system for a wireless communication system, such as the Universal Mobile Telecommunications System (UMTS) comprising a transmitting element and at least one receiver.

BACKGROUND OF THE INVENTION

Wideband Code Division Multiple Access (WCDMA) has been chosen as the radio technology for the paired bands of the UMTS. Consequently, WCDMA is the common radio technology standard for third-generation wide-area mobile communications. WCDMA has been designed for high-speed data services and, more particularly, Internet-based packet-data offering up to 2 Mbps in indoor environments and over 384 kbps for wide-area.

The WCDMA concept is based on a new channel structure for all layers built on technologies such as packet-data channels and service multiplexing. The new concept also includes pilot symbols and a time-slotted structure which has led to the provision of adaptive antenna arrays which direct antenna beams at users to provide maximum range and minimum interference. This is also crucial when implementing wideband technology where limited radio spectrum is available.

The uplink capacity of the proposed WCDMA systems can be enhanced by various techniques including multi-antenna reception and multi-user detection or interference cancellation. Techniques that increase the downlink capacity have not been developed with the same intensity. However, the capacity demand imposed by the projected data services (e.g. Internet) burdens more heavily the downlink channel. Hence, it is important to find techniques that improve the capacity of the downlink channel.

Bearing in mind the strict complexity requirements of terminals, and the characteristics of the downlink channel, the provision of multiple receive antennas is not a desired solution to the downlink capacity problem. Therefore, alternative solutions have been proposed suggesting that multiple antennas or transmit diversity at the base station will increase downlink capacity with only minor increase of complexity in terminal implementation.

According to the WCDMA system, a transmit diversity concept is under consideration which is mainly focused on the closed-loop (feedback) mode.

FIG. 1 shows an example of such a feedback mode for a downlink transmission between a base station (BS) 10 and a mobile terminal or mobile station (MS) 20. In particular, the BS 10 comprises two antennas A1 and A2, and the MS 20 is arranged to estimate the channel on the basis of two transmission signals received from the two antennas A1 and A2. Then, the MS 20 feeds back the discretized channel estimate to the BS 10. The antennas (or antenna elements) A1 and A2 are spaced sufficiently close to each other, so that the propagation delays between each of the antennas A1 and A2 and the MS 20 are approximately identical (within a fraction of a duration of a chip of the WCDMA spreading code). This is important in order to maintain downlink orthogonality in a single-path channel. Naturally, it is desired to develope a robust and low-delay feedback signaling concept.

In WCDMA, different modes have been suggested for the closed-loop concept which is optimized for two antennas. In the Selective Transmit Diversity (STD) mode, one bit per time slot is used to signal the "best" antenna from each terminal. The MS 20 estimates channel coefficients from common pilot signals (antenna or beam specific), selects the stronger antenna (two possibilities), and sends the index to the BS 10 using a 1.5 kbps subchannel. Thus, a simple dedicated channel estimate can be derived from continuous common channel estimates. In the STD mode, the bit length of the feedback signaling word is-one bit. The feedback bit rate is 1500 bps and the feedback signaling word is used for controlling the power supplied to the antennas A1 and A2.

Furthermore, modes 1 and 2 (referred to as Transmission Antenna Array (TxAA) modes) are suggested with a slower feedback link, where feedback weights used for controlling power and/or phase of the transmission signals of the antennas A1 and A2 are modified after a certain number of slots. In particular, a quantized feedback is signaled to the BS 10 using the 1.5 kbps subchannel. In mode 1, the possible Tx feedback weights are selected from a QPSK constellation. In mode 2, the possible Tx feedback weights are selected from a 16-state constellation.

FIG. 2 shows a table indicating characteristic parameters of the above modes. In particular, $N_{FB}$ designates the number of feedback bits per time slot, $N_W$ the number of bits per feedback signaling word, Na the number of feedback bits for controlling an amplification or power at the antennas A1 and A2, and Np the number of feedback bits for controlling a phase difference between the antennas A1 and A2. As can be gathered from the table of FIG. 2, one bit is fed back per time slot in each of the feedback modes.

In the Tx AA mode 1, the feedback signaling word comprises two bits, and an update is performed after both feedback bits have been received, i.e. after two time slots. The feedback signaling word is only used for controlling the phase difference between the two antennas A1 and A2.

In the Tx AA mode 2, the bit length of the feedback signaling word is four, and an update is performed every four time slots. In particular, one bit of the feedback signaling word is used for controlling the amplification (power) at the antennas A1 and A2, and three bits are used for controlling their phase difference.

FIG. 3A shows a table indicating the feedback power control performed in the STD mode. Here, the MS 20 has to estimate the antenna with the smallest path loss. To this effect, the MS 20 estimates the channel power of all "competing antennas", and determines the one with the highest power. The required channel estimates are obtained e.g. from a common pilot channel transmitted with a known power from each antenna. The table in FIG. 3A shows the relationship between the feedback value and the power $P_{A1}$ supplied to the antenna A1 and the power $P_{A2}$ supplied to the antenna A2. Accordingly, one of the two antennas A1 and A2 is selected at the BS 10 in response to the feedback signaling value.

It is to be noted that the STD mode may be implemented in an analogous manner in the beam domain. In this case, the MS 20 signals to the BS 10 whether to rotate channel symbols transmitted from the antenna A2 by 180°. In this case, the BS 10 transmits simultaneously from both antennas A1 and A2. Thus, the phase difference between the antennas A1 and A2 is switched between 0° and 180° in response to the feedback value.

In the TxAA modes 1 and 2, the MS 20 transmits estimated and quantized channel parameters to the BS 10 which then weights the transmitted signals accordingly. Thus, a higher resolution than 180° (as provided by the STD mode) can be achieved. The MS 20 selects the Tx weight (or Tx beam) from 4 or 16 different constellations, respectively.

FIG. 3B shows the feedback control performed in the TxAA mode 1, where only a phase weight feedback value comprising two bits is fed back to the BS 10. The phase difference indicated in the table of FIG. 3B defines the phase difference (in degree) between the antennas A1 and A2, which is to be established by the BS 10 in order to obtain an optimum coherence at the MS 20.

FIG. 3C shows the feedback control of the TxAA mode 2, wherein one bit, i.e. amplification bit, of the feedback signaling word is used for controlling the power of the antennas A1 and A2, and the other three bits, i.e. phase bits, are used for controlling the phase difference between the antennas A1 and A2. The left-hand table indicates the power control based on the amplification bit, wherein the power $P_{A1}$ and $P_{A2}$ supplied to the antennas A1 and A2, respectively, is switched between 20% and 80% of a predetermined value. The right-hand table shows the feedback control based on the three phase bits, wherein the phase difference can be quantified into eight different phase difference values to be established by the BS 10 in order to obtain an optimum coherence in the MS 20.

As regards the table of FIG. 2, it is to be noted that an equal power is applied to the antennas A1 and A2 in each case where Na=0. Furthermore, the antennas A1 and A2 are uniquely defined by their respective pilot codes of the CCPCH (Common Control Physical Channel) of the UMTS. The derived amplitude and phase applied to the antennas A1 and A2 is called a weight and the set of weights is grouped into a weight vector. Specifically, the weight vector for the present case of two antennas is given by $$\underline{w} = \begin{bmatrix} \sqrt{PA1} \\ \sqrt{PA2} \cdot \exp(i\pi\Delta\varphi/180) \end{bmatrix}$$

wherein Δφ denotes the phase difference (phase weight) fed back to the BS 10. In case the dimension of $\underline{w}$ becomes larger than two, more than two antennas, i.e. an antenna array, are required. As an example, a directional antenna may be achieved by using relative phases between antennas. The estimated phase of the feedback signal in the complex plane is then used for controlling the transmit direction. With a coherent array, the relative phase difference is the same between neighboring antenna elements.

Hence, the current WCDMA transmit diversity feedback concept uses a 2, 4 or 8 phase constellation to signal the channel difference to the BS 10. However, the higher channel resolution provided by a higher constellation order is obtained at the expense of feedback signaling capacity or delay. Thus, the resolution of the feedback signaling is limited by the feedback signaling capacity. Furthermore, the current concepts impose a delay of one or more slots in executing the weight change and this restricts applicability only to very slow fading channels. Also, the concepts may be sensitive to feedback errors.

SUMMARY OF THE INVENTION

It is therefore an object of the present invention to provide a method and system for transmit diversity or transmit beamforming, by means of which the resolution of the feedback signaling can be increased without increasing the feedback signaling capacity.

This object is achieved by a transmit diversity method for a wireless communication system comprising a transmitting element and at least one receiver, said method comprising the steps of:
  transmitting from said transmitting element to said at least one receiver a transmission signal in accordance with a weight information determined in response to a feedback information;
  deriving said feedback information from the response at said at least one receiver to said transmission signal;
  feeding back said feedback information using multiplexed feedback signals.

Additionally, the above object is achieved by a transmit diversity system for a wireless communication system, comprising:
  transmitting means for transmitting a transmission signal from a transmitting element in accordance with a weight information determined in response to a feedback information; and
  at least one receiver for receiving said transmission signal and deriving said feedback information from the response to said transmission signal;
  wherein said at least one receiver comprises a feedback means for feeding back said feedback information using multiplexed feedback signals.

Furthermore, the above object is achieved by a transmitter for a wireless communication system, comprising:
  extracting means for extracting a feedback information from a received signal;
  transmitting means for transmitting a transmission signal from a transmitting element in accordance with a weight information;
  determining means for determining the weight information in response to the extracted feedback information; and
  control means for controlling the determining means so as to determine said weight information in accordance with multiplexed feedback signals used for feeding back said feedback information.

Moreover, the above object is achieved by a receiver for a wireless communication system, comprising:
  receiving means for receiving a transmission signal;
  deriving means for deriving a feedback information from the response to said transmission signal; and
  feedback means for feeding back said feedback information using multiplexed feedback signals.

Accordingly, the transmit resolution can be enhanced by maintaining the feedback channel resolution and capacity signaled from the receiver and performing a suitable feedback filtering at the transmitter in accordance with the time-varying feedback signal constellation and the quantization constellation at the terminal. Thereby, the effective resolution of the total feedback signaling can be improved while maintaining the signaling channel capacity, since the feedback information can be divided and spread over different sets of time slots, e.g. in accordance with the time-varying signal constellation or by using multiple different constellations. The filtering is applied to at least two sub-channels. The transmitting signal may comprise a probing signal used for channel measurements and channel quantization and an information transmitted via the dedicated channel on the basis of the transmit weights.

According to the invention, multiplexed feedback signals can be used for representing the quantized state of the channel. Thereby, the type, coding, partitioning or allocation of the feedback signals may differ in different multiplex subchannels defined by a time division, frequency division, or code division multiplexing scheme.

Thus, the weights applied to the antennas A1 and A2 can be demultiplexed from the feedback channel and need not be identical with the feedback signaling of the current time slot received from the receiver. In particular, a multiplex timing can be arranged such that the current feedback modes still can be established. Each subchannel may independently define a basic resolution, and the subchannels may jointly define an increased resolution. According to the invention, at least two feedback subchannels are used. The multiplexed feedback signals are demultiplexed at the transmitting element and then filtered in order to obtain the desired transmit weights. After filtering, the estimated weight may be quantized to the Tx weight constellation. Thus, a flexible feedback concept is achieved, in which the transmit weights are derived from the feedback signals but need not match them exactly.

Furthermore, a higher transmit weight resolution and robustness can be achieved e.g. by multiplexing different feedback signals which are to be combined in a suitable way, e.g. by a Finite Impulse Response (FIR) filtering or an Infinite Impulse Response (IIR) filtering, at the transmitter. The filtering can also take into account the reliability of the received feedback signals. Then, the filter can determine the weights based on a higher weighting of the reliable feedback signals. Therefore, the present TxAA mode 2 resolution can be achieved, since it can be established on the basis of e.g. the present TxAA mode 1 by multiplexing two different feedback signals and filtering them suitably. In this case, the feedback signaling and the channel estimation can be maintained, while slightly changing the feedback signal determination. However, no changes are required to the common channels.

The length of the filter impulse response should be matched to the channel characteristics (e.g. Doppler spread or autocorrelation) in the sense that longer filters can be used when channel changes are slow. The type of filter can be determined from the received signal or it can be negotiated between the transmitter and the receiver. Furthermore, the demultiplexing and subsequent filtering can be performed on the feedback signal or on the transmit weights to which the feedback signals correspond, or both. In particular, gain and phase information can be filtered separately or jointly. To reduce delay and increase weight accuracy, the filter can operate as a predictor, so that transmit weights can be predicted based on the available smoothed information until the command is transmitted, current weights and/or previous weights and/or received feedback commands. In addition, the filtering can be linear or non-linear. Furthermore, a robust filtering, e.g. using a median filtering, can be applied, which is preferred, since feedback errors may cause "outliers" weights, i.e. erroneous weights due to a wrong index rather than an estimation error in determining the index/quantization.

Hence, the channel is quantized to a plurality of feedback signal quantization constellations, and each quantized value is transmitted via a different multiplexed feedback subchannel. Thereby, a user may use different channel quantization constellations at different quantization intervals which may possibly overlap. The different quantization constellations may be independent, e.g. suitable rotations of each other, or may be formed in a dependent or hierarchical manner by a set partitioning, wherein the dependent constellations are jointly used to define the feedback signal with increasing accuracy (e.g. the first two bits transmitted in a first subchannel may designate a weight quadrant, and the third bit transmitted in a second subchannel may specify one of two weight points within the weight quadrant). Furthermore, different quantization constellations can be provided for different users.

Preferably, the multiplexed feedback signals may comprise a first feedback signal having a first constellation and a second feedback signal having a second constellation. The first and second feedback signals may be transmitted in different time slots and/or by using different codes.

The first feedback signal may define a first phase weight determined on the basis of a channel estimate, and the second feedback signal may define a second phase weight determined on the basis of a rotated constellation. In particular, the second phase weight may be based on a rotated channel estimate of the same constellation, or on a rotated channel estimate of another constellation, or on the basis of a quantization of the channel estimate to the second (rotated) constellation. The first and second feedback signals may be fed back in successive time slots. Moreover, the first feedback signal may define a real part of the weight information, and the second feedback signal may define an imaginary part of the weight information.

Alternatively, the first feedback signal may define a first feedback information to be used for updating a first beam of the transmitting element, and the second feedback signal may define a second feedback information to be used for updating a second beam of the transmitting element. In this case, the first feedback signal can be fed back during odd time slots and the second feedback signal during even time slots. The odd and even time slots may be used for controlling the same antenna (when the channel difference is used) or a first antenna and a second antenna, respectively, in different time instants. In-the latter case, the first and second antennas are alternately used as a reference. Controlling both antennas, e.g. by transmitting control commands in an alternate manner to the transmitting element, is preferred in cases where the effective transmitting power of the controlled antenna can be reduced by the filtering. When both antennas are generally controlled, the effective transmitting power is distribuited evenly and this simplifies the designs of a provided power amplifier. Another possible solution is to use transmit diversity techniques where different users may control different antennas.

Furthermore, the first feedback signal may define a quadrant in a 4-PSK constellation, and the second feedback signal may define a constellation within said quadrant defined by said first feedback signal. The second feedback signal may define a differential change, a Gray-encoded sub-quadrant, or a combination thereof. The multiplexed feedback signals may be transmitted by at least two users having different feedback signal constellations. Thereby, a flexible and readily adaptable transmit diversity system can be achieved. The at least two users may comprise a first set of users controlling weights at a first antenna of the transmitting element, and a second set of users controlling weights at a second antenna of said transmitting element. In this case, a useful balancing of the transmitting power between the first and second antennas can be provided, since some filtering or demultiplexing techniques may result in lower transmission power requirements at the controlled antenna.

Furthermore, the control means provided in the transmitter may comprise a switching means for alternately switching the first feedback signal and the second feedback signal to the determining means. The determining means may be arranged to derive the weight information from the first and second feedback signal.

Moreover, the control means may be arranged to control the transmitting means so as to alternately update a first beam of the transmitting element by using a first weight information determined on the basis of the first feedback signal, and a second beam of the transmitting element by using a second weight information determined on the basis of the second feedback signal.

The transmitting element may be an antenna array. In this case, the feedback information can be used for controlling the direction of transmission of the array antenna. The transmission direction may be derived from at least one of the multiplexed feedback signals. Furthermore, the transmission direction may be derived from a phase estimate obtained from at least one feedback signal.

Furthermore, the deriving means of the receiver may comprise extracting means for extracting a probing signal transmitted with a known power, channel estimation means for performing a channel estimation on the basis of the extracted probing signal, and generating means for generating the multiplexed feedback signals on the basis of the channel estimation. The generating means may be arranged to generate the first and second feedback signal, wherein the feedback means may be arranged to feed back the first and second feedback signals as the multiplexed feedback signals. The first and second feedback signals may be fed back alternately by the feedback means, wherein a quantization of the feedback information is based on the latest channel estimate and an available one of the first and second constellation.

Moreover, the generating means may be arranged to generate the first feedback signal based on the channel estimate and the second feedback signal based on a rotation of the channel estimate by a predetermined angle. This can be implemented also by quantizing the same channel estimate to two constellations where, in this case, the second one is a rotated copy of the first one.

Alternatively, the generating means may be arranged to generate the first feedback signal based on a real part of the feedback information, and the second feedback signal based on an imaginary part of the feedback information.

As a further alternative, extracting means may be arranged to alternately extract a probing signal corresponding to a first beam and a probing signal corresponding to a second beam, and the generating means may be arranged to alternately generate the first feedback signal based on a channel estimate for the first beam, and the second feedback signal based on a channel estimate for the second beam.

Furthermore, the transmit weight information may be determined by quantizing the filtered feedback information to a desired quantization constellation. In this case, the filtered feedback information may comprise four constellation points or states and the quantization constellation may comprise e.g. eight or sixteen constellation points or states. The feedback signal filtering operation may be performed by a moving average filter of a length of N samples, wherein N is larger than the number of said multiplexed feedback signals. Thus, the transmit weight constellation can be enhanced by using a subsequent quantization to a desired constellation with more states.

Furthermore, the above object is achieved by a transmit diversity method for a wireless communication system comprising a transmitting element and at least one receiver, said method comprising the steps of:

transmitting from said transmitting element to said at least one receiver a transmission signal in accordance with a weight information determined in response to a feedback information;

deriving said feedback information from the response at said at least one receiver to said transmission signal;

feeding back said feedback information to said transmitting element; and determining said weight information by filtering said feedback information and quantizing the filtered feedback information to a desired quantization constellation.

Additionally, the above object is achieved by a transmitter for a wireless communication system, comprising:

extracting means for extracting a feedback information from a received signal;

transmitting means for transmitting a transmission signal from a transmitting element in accordance with a weight information;

determining means for determining said weight information in response to said extracted feedback information; and control means for filtering said extracted feedback information, and for quantizing the filtered feedback information to a desired quantization constellation.

Accordingly, the transmit weight constellation can be enhanced in a certain feedback mode by performing a subsequent quantization of the filtered feedback signal, whereas the capacity of the feedback channel is maintained. Thus, the user terminal or mobile station does not need to know which constellation is used. Thereby, the quantization constellation at the receiver may differ from the transmit constellation. The transmit constellation may change due to power amplifier loading, e.g. so that only perfectly power balanced weights are used in a given slot (thereby neglecting gain signaling in the 16-state constellation).

Preferably, the control means comprises a moving average filter for performing the feedback signal filtering operation.

BRIEF DESCRIPTION OF THE DRAWINGS

In the following, the present invention will be described in greater detail on the basis of a preferred embodiment with reference to the accompanying drawings, in which:

FIGS. 3A to 3C show tables indicating characteristic parameters relating to the feedback control of the STD and TxAA modes, respectively, FIG. 4 shows tables indicating characteristic parameters of the transmit diversity concept according to a first example of the preferred embodiment of the present invention, FIG. 6 shows a diagram of complex weight parameters according to the first example of the preferred embodiment, FIG. 7 shows tables indicating characteristic parameters of the transmit diversity concept according to a second example of the preferred embodiment, FIG. 8 shows a diagram of complex weight parameters according to the second example of the preferred embodiment.

DESCRIPTION OF THE PREFERRED EMBODIMENT

Figures 1, 2:
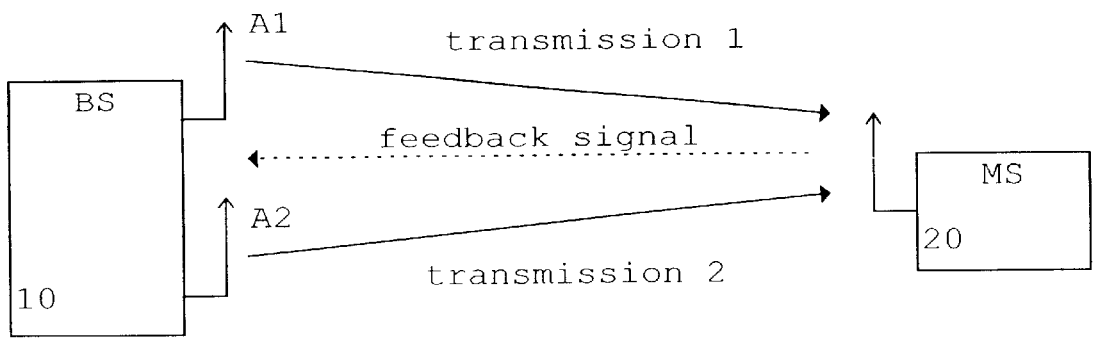
FIG. 1 shows a principle block diagram of a closed-loop transmit diversity system comprising a base station and a mobile station.
FIG. 2 shows a table indicating characteristic parameters of the STD and TxAA modes.

In the following, the preferred embodiment of the method and system according to the present invention will be described on the basis of a connection between the BS 10 and the MS 20 of the UMTS, as shown in FIG. 1.

According to the preferred embodiment of the present invention, the feedback information is transmitted from the MS 20 to the BS 10 using a feedback concept based on time multiplexing. This means that the quantization constellation used in deriving the feedback signals is changed and signaled to the BS 10 in different time slots. However, any other multiplex scheme such as frequency multiplexing or code multiplexing may be used as well in the feedback channel.

In particular, the feedback signal constellation may be changed with respect to the coding, type, partitioning or allocation of the feedback information. Thus, with the present time multiplexed feedback subchannels, the signaling capacity required in the feedback channel can be maintained, while the feedback information as such is spread over the time axes, i.e. transmitted in two or more (sets of) time slots which may be allocated according to a predefined rule, known to both the BS 10 and the MS 20.

In the following, examples of the preferred embodiment are described with reference to FIGS. 4 to 8, wherein the feedback information is spread over successive time slots.

FIG. 4 shows two tables indicating a refined TxAA mode 1 concept. According to this example, two reference channels, i.e. for the channel estimate and a rotated channel estimate, are used in the MS 20 in order to derive the feedback information. Thereby, an 8-phase signaling can be implemented by using the TxAA mode 1 feedback signaling, i.e. two feedback bits. In particular, a first feedback information relating to the channel estimate is transmitted in two successive time slots, and a second feedback information relating to the rotated channel estimate is transmitted in the following two successive time slots.

Thus, the whole feedback information is transmitted in four successive time slots. Accordingly, the phase difference relating to the channel estimate is transmitted in slots S1 ={1, 2, 5, 6, 9, 10, . . . } defining a first feedback subchannel, and the phase difference quantized to the rotated constellation is transmitted in slots S2={3, 4, 7, 8, 11, 12, . . . } defining a second feedback subchannel, wherein the rotated channel estimate relates to a 45° rotated channel estimate, assuming a 4-phase constellation is used.

Thus, the effective phase differences for the phase bits transmitted in the slots S1 is indicated by the upper table of FIG. 4, and the phase difference defined by the phase bits transmitted in the slots S2 is indicated in the lower table of FIG. 4. Accordingly, the phase difference can be quantized into 8 values while using only two bits of feedback information at a time, as in the TxAA mode 1. The resulting feedback resolution obtained by a filtering or demultiplexing operation at the BS 10 corresponds to a 16-state feedback mode, with the exception that a constant power is used for each of the antennas A1 and A2. Thus, the feedback resolution can be increased while maintaining the feedback signaling capacity of the TxAA mode 1.

Figure 5:
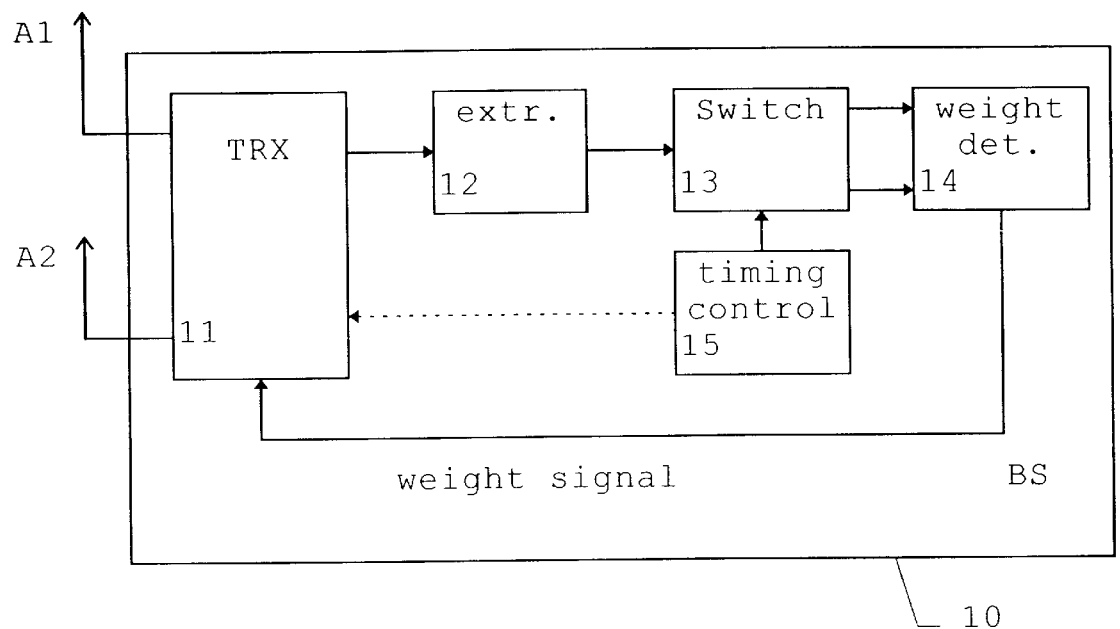
FIG. 5 shows a principle block diagram of a base station and a mobile station according to the preferred embodiment of the present invention.
Figure 5:
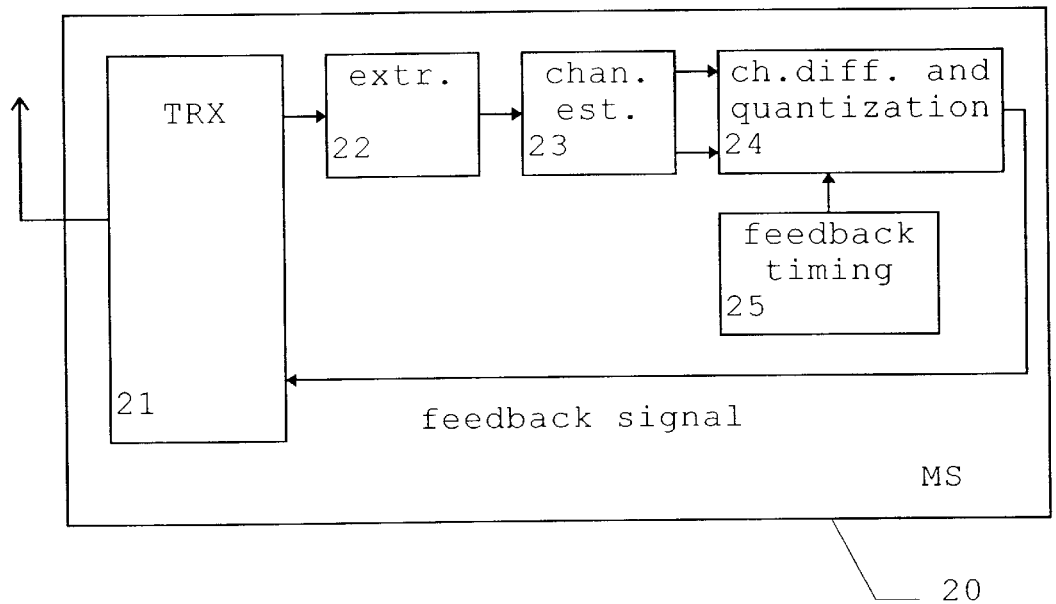

FIG. 5 shows a principle block diagram of the MS 20 and the BS 10 according to the preferred embodiment of the present invention.

According to the FIG. 5, the BS 10 comprises a transceiver (TRX) 11 arranged for feeding the two antennas A1 and A2 and connected to an extracting unit 12 provided for extracting the feedback information transmitted from the MS 20 via the corresponding feedback channel(s). The extracted feedback information is supplied to a switch 13 which is controlled by a timing control unit 15 in accordance with the timing scheme underlying the multiplex scheme of the feedback signal constellation used by the MS 20. Thereby, a demultiplexing or filtering function for extracting the feedback information is provided. In the present example, the switch 13 is controlled by the timing control unit 15 so as to supply the feedback information relating to the slots S1 to one of its output terminals and the feedback information transmitted in the slots S2 to the other one of its output terminals.

It is noted that the above demultiplexing or filtering function may alternatively be achieved by providing filter and demodulating unit or a decoding unit, in case a frequency or, respectively, code multiplex scheme is used.

The output terminals of the switch 13 are connected to respective input terminals of a weight determination unit 14 which determines a weight signal on the basis of the tables shown in FIG. 4. In particular, the weight determination unit 14 determines the required phase difference between the antennas A1 and A2 by averaging the feedback information of the two slot types S1 and S2 received via the respective input terminals. However, any other combination of the two feedback informations may be provided.

The determined weight signal, e.g. phase difference, is supplied to the TRX 11 which performs a corresponding phase control of the antennas A1 and A2 to thereby establish the required phase difference leading to an optimum coherence of the transmission signals in the MS 20.

The MS 20 comprises a transceiver (TRX) 21 for receiving the transmission signals from the antennas A1 and A2 of the BS 10 via an antenna connected thereto. Furthermore, the TRX 21 is connected to an extracting unit 22 provided for extracting the pilot channel signal and supplying the extracted pilot channel signal to a channel estimation unit 23 which calculates the required channel estimates. In WCDMA systems, rather accurate channel estimates can be obtained by using the common channel pilots (CPICH) transmitted continuously from the two antennas A1 and A2 using a specific orthogonal spreading code. In particular, the channel estimation unit 23 is arranged to calculate the channel estimate and the rotated channel estimate both corresponding to the received pilot channel signal. The channel estimation unit 23 outputs the two channel estimates at respective output terminals thereof which are connected to corresponding input terminals of a channel difference deriving and quantization unit 24 for deriving a phase difference based on the channel estimate and the rotated channel estimate obtained from the channel estimation unit 23 and performing a corresponding quantization. As already mentioned, the rotated channel estimate is obtained by rotating the channel estimate by an angle of 45°.

Furthermore, a feedback timing unit 25 is provided which controls the phase difference deriving and quantization unit 24 so as to output one of the phase differences derived from the channel estimate and the rotated channel estimate in accordance with the predetermined feedback timing. In the present case, the phase difference corresponding to the channel estimate, i.e. conventional TxAA mode 1, is outputted during the time slots S1, and the phase difference corresponding to the rotated channel estimate is outputted during the time slots S2. The phase differences are supplied as a multiplexed feedback signal to the TRX 21 in order to be transmitted via the corresponding feedback channel to the BS 10.

It is to be noted that the transmit diversity concept according to the first example of the preferred embodiment is compatible with the known TxAA mode 1, in case the BS 10 assumes each feedback information as derived only from the channel estimate which has not been rotated, i.e. the known BS 10 controlled according to the TxAA mode 1.

In case a frequency or code multiplex feedback scheme is used, the feedback timing unit 25 may be replaced by a modulating unit or, respectively, a coding unit.

FIG. 6 shows a diagram of the complex weights or end points of the weight vectors used as the feedback information in the first example of the preferred embodiment. In particular, the circles in the diagram of FIG. 6 indicate the weights obtained in the slots S1, i.e. the weight of the conventional TxAA mode 1, and the crosses indicate the additional weights obtained in the time slots S2. Thus, a phase difference quantization as provided in the TxAA mode 2 can be obtained without increasing the feedback channel signaling capacity.

FIG. 7 shows a second example of the preferred embodiment, wherein the feedback resolution of the TxAA mode 1 is obtained while using only a single feedback bit. Thus, this example relates to a refined STD mode. In particular, the MS 20 performs a continuous measurement or channel estimation, e.g. on the basis of a sliding window, and the phase difference deriving unit 24 quantizes the phase difference in accordance with the TxAA mode 1 phase constellation. In the present case, the feedback bits for the real and imaginary part of the complex weight, determined by the phase difference, are transmitted in successive slots, e.g. the real part bit in the odd slots used as a first feedback subchannel and the imaginary part bit in the even slots used as a second subchannel. A corresponding control is performed by the feedback timing unit 25 of the MS 20.

Correspondingly, the timing control unit 15 of the BS 10 controls the switch 13 so as to supply the successive real and imaginary part of the feedback information to respective input terminals of the weight determination unit 14 which determines the corresponding weight-signal supplied to the TRX 11 in order to establish the required phase difference.

In case the BS 10 is not controlled in accordance with this time control scheme, i.e. the current STD mode is used, the conventional control is obtained. If the new timing control is provided, the weight determination unit 14 averages over two slots and changes the weight signal correspondingly.

Thus, a four state resolution is obtained with an STD mode feedback capacity. Moreover, a weight verification can be incorporated separately for the successive bits, which corresponds to the STD concept.

Thus, as can be gathered from FIG. 7, the feedback information provided in the odd slots $S_{odd}$ indicates a phase difference of 0° or 180°, and the feedback information provided in the even slots $S_{even}$ indicates a phase difference of −90° or +90°.

FIG. 8 shows a diagram of the complex weights which can be fed back in each slot of the second example of the preferred embodiment, wherein the crosses indicate the weight information transmitted in the slots $S_{even}$ and the circles indicate the weights transmitted in the slots $S_{odd}$.

In the above second example, the channel estimation unit 23 of the MS 20 is arranged to determine channel estimates using the common pilot channel (CPICH). A phasor $\exp(i\hat{\Phi})$ ($\Phi = \pi\Delta\phi/180$) which indicates the phase of the complex weight is then determined by the channel difference deriving and quantization unit 24 and is quantized to the constellations indicated in FIG. 7, i.e. $S_1 = \{1, -1\}$ (for odd slots) and $S_2 = \{i, -i\}$ (for even slots). The corresponding feedback messages (phase bits) are "0" and "1", wherein "0" designates that the first constellation point is closer to the phasor. Similarly, the feedback message "1" designates that the second constellation point is closer to the phasor. As already mentioned, the use of the above two reference constellations results in a concept where a terminal (MS 20) signals the imaginary part and the real part of the most recent estimate of the downlink channel in successive slots (or in two subchannels).

In the second example, the BS 10 may filter (average) the feedback weights/phases in two consecutive slots while maintaining the transmitted power the same in both antennas A1 and A2. Then, the resulting weight constellation has four states (similar to QPSK (Quadrature Phase Shift Keying)). Averaging introduces half a slot delay to the output so that the total signaling delay becomes one and a half slots. The overall control delay is thus reduced half a slot when compared to a concept where the weight is applied only after the complete feedback word has been received.

Since there are only four possible weights, the dedicated channel pilots (and channel estimate) can be used effectively in order to verify which one of the weights was in fact transmitted. Once the weight is known, the received channel vector between the diversity antenna and the terminal can be obtained on the basis of a multiplication of the weight and the channel estimate determined from the common channel. Thus, the verification allows to use the continuous common channel estimate in maximal ratio combining.

According to a third example of the preferred embodiment, a beam diversity concept can be adopted by the feedback scheme in order to provide an enhanced robustness against erroneous signaling. In the third example, it is assumed that a space time coding (STTD) is used at the MS 20, wherein encoded channel symbols are divided into two-element blocks and transmitted as b[2n], b[2n+1] and −b*[2n+1], b*[2n] from the antennas A1 and A2, respectively, during time instants 2n and 2n+1 using the same spreading code. This simple symbol level orthogonal coding scheme doubles the time diversity, wherein the receiver uses a simple linear decoding to detect the transmitted symbols. In the present case, two weight vectors are used, which are a function of the received signaling. In case of the STD mode feedback signaling, the following processing is performed.

Two beams B1 and B2 are transmitted by the antennas A1 and A2 of the BS 10 in each time slot. The update rate of the beams B1 and B2 is 800 Hz, i.e. the TRX 11 is updated every other time slot. In particular, the beam B1 is modified during odd slots and the beam B2 during even slots, where each weight modification is effective over two time slots, i.e. a sliding window weight change is provided. Hence, the extracting unit 22 of the MS 20 is arranged to extract the corresponding probing or pilot signals received from the the beams B1 and B2, and to successively supply them to the channel estimation unit 23. Then, the feedback timing unit 25 controls the phase difference deriving unit 24 so as to output the respective phase differences at timings corresponding to their allocated time slots.

It is to be noted that the filtering function provided by the switch unit (or filter unit) 13 and the timing control unit 15 of the BS 10 is not required in the present case, if the TRX 11 is arranged to determine and correspondingly allocate successively received weight signals to their respective beams B1 or B2. However, if this is not the case, the timing control unit 15 controls the switch unit 13 so as to switch the weight signal of the beam B1 (transmitted in an odd slot) to one of its output terminals and the weight signal of the beam B2 (transmitted in an even slot) to the other output terminal and the weight determination unit 14 determines the corresponding weight signal. In addition, the timing control unit 15 is arranged to control the TRX 11 so as to allocate the received weight signal to the corresponding one of the beams B1 and B2. This control feature is indicated by the broken error shown in the block diagram of the BS 10 of FIG. 5.

The quantization and signaling concept in the initially described known STD mode which does not comprise any filtering of the feedback signal at the BS 10 enables only a crude beamforming with 180 degree effective weight resolution.

In the above described second example of the preferred embodiment, the filtering (or averaging) of two successive feedback bits (i.e. real and imaginary part) increases the number of states to four and imposes memory to the transmit weights.

According to another filtering approach, the weight resolution can be further improved by increasing the number of states in the weight constellation. Preferably, a single feedback mode can be obtained, which blindly adapts the transmission weights (constellation) to a given channel.

The blind processing considered here is based on the fact that the received uplink signal has the same average characteristic as the downlink signal, although the channels are not reciprocal in such FDD (Frequency Division Duplex) systems. This average information (e.g. number of paths, Doppler estimates, etc.) can be used to match the filtering at the BS 10 so that, e.g. in rapidly fading channels, the filter is shorter, and that, in very slowly fading channels, a filter with narrower bandwidth is used. Then, the MS 20 may always transmit the feedback signals (e.g. in accordance with the second example) and the actual filtering concept does not need to be known precisely by the MS 20. Possible filtering techniques include FIR, IIR or non-linear filtering operations (e.g. median filtering).

Furthermore, it is possible to take into account the reliability of each received feedback command (and deriving e.g. an a posteriori mean weight) in order to mitigate the effects of unreliable feedback channels.

In the following, further examples of the preferred embodiment are given as generalizations of the above second example. However, it is noted that the following examples may as well be advantageously implemented in the known STD and TxAA modes where only one feedback signal is used.

According to a fourth example, the feedback measurements using rotated constellation (real and imaginary parts) of the second example are applied, wherein the filtering operation at the BS 10 is applied over N feedback commands (or slots), rather than two. Then, the transmit weights are given by:

$$w_2(t) = exp(i\phi(t))$$

$$\Phi(t) = arg\left(\sum_{t'=t}^{t-N+1} i^{t' mod 2} sgn(z(t'))\right)$$

wherein $z(t)=b(t)+n(t)$ denotes the received feedback signal, $n(t)$ the noise signal at the BS 10, $b(t)$ the feedback command received at the BS 10 for slot t (corresponding to states $\pm i^{t' mod 2}$ at formal), and $w2(t)$ denotes the complex weight applied in the diversity antennas A1 and A2.

According to a fifth example of the preferred embodiment, four different constellations are provided at the MS 10, such that the channel difference deriving and quantization unit 24 quantizes the complex weight (phase difference) in four successive downlink slots to $S_1=\{1, -1\}$, $S_2=\{i, -i\}$, $S_3=\{i^{1/2}, \}$ and $S_4=\{i^{-1/2}, -i^{-1/2}\}$. The BS 10 filters the constellation with a moving average filter of length N samples. When N=4, this gives rise to a time-varying 8-PSK constellation. The transmit weights are given by:

$$w_2(t)=exp(i\Phi(t))$$

$$\Phi(t) = arg\left(\sum_{t'=t}^{t-N+1} i^{(t' mod 4)/2} sgn(z(t'))\right)$$

According to a sixth example of the preferred embodiment, a case is considered with three rotated constellations using 60 degrees resolution in terminal quantization. Here, $S_1=\{1, -1\}$, $S_2=\{i^{1/3}, -i^{1/3}\}$ and $S_3=\{i^{2/3}, -i^{2/3}\}$ and the filtered transmit weigths are given by:

$$w_2(t)=exp(i\Phi(t))$$

$$\Phi(t) = arg\left(\sum_{t'=t}^{t-2} i^{(t' mod 3)/3} sgn(z(t'))\right)$$

According to a seventh example of the preferred embodiment, the above three constellations according to the sixth example are used in addition with the reliability of the received symbols in defining the transmit beam, where different alternatives are possible in filtering, e.g. the function $f(x)=x$ might replace $sgn(x)$, or $tanh(x)$ might be used in the above equation defining $\Phi(\chi)$, and the complex weight may be quantized to four states (QPSK) after filtering. It is to be noted that, in the examples given above, a hard decision $(sgn(z(t')))$ on the feedback signals is made at first, before the averaging operation is performed. This leads to a QPSK constellation although not explicitly stated. However, quantization may not be desirable, unless the number of states is to be reduced in order to apply efficient weight verification algorithms.

Of course, a quantization to any constellation (in place of QPSK) is possible in the present seventh example. When the power constraint is dispensed, a 16-state constellation can be used, for example. In these cases, weight verification is not practical, but dedicated pilots can be used in the channel estimation. Then, the weight is given e.g. by:

$$w_2(t) = \sum_{t'=t}^{t-2} i^{(t' mod 3)/3} tanh(z(t')|\alpha|/\sigma^2)$$

wherein $\sigma^2$ denotes the variance of the channel noise in $z(t')$, and $|\alpha|$ denotes the amplitude of the received feedback command $z(t')$.

It is noted that, in the case described above, the transmit weight does not need to have a constant amplitude. For example, when the channel amplitude is zero (or noise variance is $\infty$), the amplitude of the weight will be zero, $tanh(z(t')|\alpha|/\sigma^2)\rightarrow 0$, i.e. the respective antenna is automatically switched off in cases where the feedback is noisy. In general, the amplitude of the weight tends to be less than one. The maximum value (Tx power) is the same as for the primary (non-diversity) antenna. It is noted that it would be also possible for the MS 20 to effectively shut off diversity transmission or control the weights by masking the feedback command, e.g. using a Walsh code $w_k$ in transmission, when the BS 10 expects $w_{k', k' \neq k}$. If all terminals do this, it would be beneficial to have different users controlling different antennas to average the load to the power amplifiers. A partially correlated mask $c_k$ can be used as well, when $0 \leq w_k^T c_k \leq 1$.

The above beamforming concept according to the seventh example may be applied to remove the TxAA mode 2. This would entail the following changes to the concept. Each feedback bit (and bit reliability) is calculated as defined before, e.g. using the three state constellation (60 degrees rotation). The transmit phase for slot t is a linear combination of the alternative weigths in a particular window. Subsequently, the filtered state is quantized to the nearest constellation point that can be transmitted, which does not need to belong to those currently allowed in the TxAA mode 2. In case of the TXAA mode 1 phase resolution, the following algorithm is used:

$$w_2(t) = 8QPSK\left(\sum_{t'=t}^{t-3} \left(i^{(t' mod 2)/2} P(b(t')\right.\right.$$
$$= 1 | z(t')) + (-i)^{(t' mod 2)/2} P(b(t')$$
$$= -1 | z(t')))v_{t'}$$

wherein 8PSK denotes a quantization to the 8-PSK states, $v_{t'}$ denotes FIR coefficients e.g. of the moving average filter, and P(b=1|z) and P(b=-1|z) denote conditional probabilities for the cases b=1 and b=-1, respectively. These probabilities may be derived e.g. from the statistics minimizing the MSE (Mean Square Error).

With Gaussian noise n, the $\tanh(z(t')|\alpha|/\sigma^2)$ function appears as the reliability weight. Naturally, the tanh-function may be approximated using well known techniques.

Subsequently, the following equation may be used:

$$w_2(t) = 8PSK\left(\sum_{t'=t}^{t-3} i^{(t' mod 3)/3} \tanh(z(t')|a|/\sigma^2)\right)v_{t'}.$$

Furthermore, one additional feedback bit can be sent to designate the relative power (e.g. 0.8 or 0.2) between the weights $w_1$ and $w_2$ supplied to the antennas A1 and A2, respectively. Moreover, a verified weight verification can be used in the MS 20 and the transmit weights can be defined e.g. as in the STD mode or the TxAA mode 2. The difference is only the way the BS 10 interprets the feedback commands and into which constellation the filtered signal is quantized (e.g. QPSK in case a verification is applied, and QPSK, 8 or 16 PSK in case a dedicated pilot is used). This concept makes the system very robust. The MS 20 does not need to know which mode is being used by the BS 10 unless it applies a verification. The Tx constellation can be signaled to the terminal using a dedicated channel, or the Tx constellation can be estimated from the received signal. Furthermore, a suboptimum verification concept can be adopted which alleviates this problem as well. The mode change would be only a change of the quantization constellation at the BS 10, which is not critical from the user equipment's point of view.

Thus, efficient filtering techniques and a subsequent quantization based on the same or another transmit constellation can be performed. The MS 20 does not need to know which constellation is used if e.g. TxAA mode 2 dedicated pilots are used in the downlink direction. However, if the MS 20 derives the quantization constellation (or it is signaled thereto) it can apply a weight verification as in STD mode.

Additionally, a non-linear filter operation may be applied. Such a non-linear filtering may be achieved by using a trellis-based weight determination (using a known trellis), wherein the BS 20 uses a sequence of previous feedback commands (including a reliability information) and a trellis-structure indicating possible transitions either in TxAA mode 1 or in the hierarchical TxAA mode 2. Then, the transmit weight can be calculated using a sequence estimator or a MAP detector, wherein the transition possibility depends on the feedback bit reliability. Thus, the probabilities P(b=1|z) and P(b=-1|z) described in the above equation and the weight trellis structure may be used to aid the non-linear weight determination.

It is to be noted that the above described units of the block diagram shown in FIG. 5 may as well be established as software features of a control program controlling a microprocessor such as a CPU provided in the BS 10 and the MS 20.

Furthermore, any kind of signal set partitioning (e.g. for trellis codes) may be used to improve the performance. Furthermore, the different feedback signal constellations may be dependent by using a progressive signaling. For example, a first time slot or subchannel can be used for feeding back an information indicating a quadrant in a 4-PSK constellation with higher reliability, and a subsequent second time slot or subchannel can be used for feeding back an information determining the constellation within this quadrant. The feedback information of the second subchannel may be based on a differential change, a Gray-encoded sub-quadrant, or any combination thereof. Here, the transmit weights can be changed as soon as the feedback bits specifying the quadrant have arrived at the BS 10, and the refined subquadrant can be adjusted thereafter based on the most recent channel estimate, which was not available when the quadrant index was transmitted (e.g. using Gray encoding). Thereby, additional delay caused in the current concept by waiting for the receipt of all feedback bits can be prevented. Furthermore, abrupt changes (180 degree in case of one bit feedback, 90 degrees in case of two bit feedback, and so on), as in the current concepts, which cannot be followed by the MS 20 estimating the dedicated channel parameters do not occur. Hence, applying the feedback information incrementally not only reduces delay, but also enables more efficient channel estimation and receiver performance. The feedback information may also refer to the phase difference of successive slots.

As an example, a 3-bit Gray code can be used in the TxAA mode 2 to indicate the phase states of the transmit weight.

Thus, successive states are coded 000 (state 1), 001 (state 2), 011 (state 3), 010 (state 4), 110 (state 5), 111 (state 6), 101 (state 7), and 100 (state 8). Accordingly, regarding the first bit of the above coding, the following possible transitions can be defined in the trellis structure: state 1→state 1 or 8, state 2→state 2 or 7, state 3→state 3 or 6, state 4→state 4 or 5, state 5→state 5 or 4, state 6→state 3 or 6, state 7→state 7 or 2, and state 8→state 8 or 1. Similarly, possible transitions can be obtained for bits 2 and 3. This transition information can then be used in the estimation of the transmit weights with increased reliability.

The present invention is not limited to two antennas A1 and A2, but can be applied to any multi-antenna transmitter in order to provide a higher resolution feedback. Moreover, as already mentioned, any kind of multiplex scheme can be used, provided the BS 10 is arranged to correspondingly filter or select the feedback information.

Moreover, the present invention may be applied to any wireless communication system comprising a transmit diversity or transmit beamforming concept used between a transmitting element and at least one receiver. Therefore, the above description of the preferred embodiment and the accompanying drawings are only intended to illustrate the present invention. The preferred embodiment of the invention may vary within the scope of the attached claims.

In summary, the invention relates to a transmit diversity method for a wireless communication system comprising a transmitting element and at least one receiver, wherein a transmission signal is transmitted from the transmitting element to the at least one receiver in accordance with a weight information determined in response to a feedback information. The feedback information is derived from the response at the at least one receiver to the transmission signal, and is fed back using multiplexed feedback signals. Alternatively, the weight information may be determined at the transmitting element by filtering said feedback information and quantizing the filtered feedback information to a desired quantization constellation. Thus, multiple quantization constellations and combinations thereof and/or constellation specific feedback subchannels can be used for channel probing, such that the total feedback resolution can be enhanced, while maintaining low signaling capacity of the feedback channel.

What is claimed is:

1. A transmit diversity method for a wireless communication system comprising a transmitting element and at least one receiver, said method comprising the steps of:
   a) transmitting from said transmitting element to said at least one receiver a transmission signal in accordance with a weight information determined in response to a filtered feedback information, wherein said weight information is determined by quantizing said filtered feedback information to a desired quantization constellation;
   b) deriving said filtered feedback information from the response at said at least one receiver to said transmission signal; and
   c) feeding back said filtered feedback information using multiplexed feedback signals.

2. A method according to claim 1, wherein said feedback information is used for controlling a transmit weight of one of two antennas.

3. A method according to claim 2, wherein said feedback information contains a first information on the transmission power of said two antennas and a second information on the phase of said two antennas.

4. A method according to claim 3, wherein said first information or said second information or both are separately filtered at said transmitting element.

5. A method according to claim 1, wherein said feedback information is used for controlling transmit weights of two antennas.

6. A method according to claim 5, wherein control commands for controlling said two antennas are transmitted alternately to said transmitting element.

7. A method according to claim 1, wherein said transmitting element comprises an antenna array.

8. A method according to claim 7, wherein said feedback information is used for controlling the direction of transmission of said antenna array.

9. A method according to claim 8, wherein the direction of transmission is derived from at least one feedback signal.

10. A method according to claim 9, wherein the direction of transmission is derived from a phase estimate of at least one extracted feedback signal.

11. A method according to claim 1, wherein said weight information and/or a direction of transmission are determined on the basis of a feedback signal filtering operation.

12. A method according to claim 11, wherein a transmission filtering is adapted to a transmission channel characteristic and changed dynamically.

13. A method according to claim 11, wherein the filter characteristic of said filtering operation is controlled based on a signaling between said transmitting element and said at least one receiver.

14. A method according to claim 1, wherein a reliability of said multiplexed feedback signals is used for weight determination.

15. A transmit diversity method for a wireless communication system comprising a transmitting element and at least one receiver, said method comprising the steps of:
   a) transmitting from said transmitting element to said at least one receiver a transmission signal in accordance with a weight information determined in response to a feedback information;
   b) deriving said feedback information from the response at said at least one receiver to said transmission signal; and
   c) feeding back said feedback information using multiplexed feedback signals;
   wherein said multiplexed feedback signals comprises at least a first feedback signal having a first quantization constellation and a second feedback signal having a second quantization constellation.

16. A method according to claim 15, wherein said at least first and second feedback signals are transmitted in different time slots.

17. A method according to claim 15, wherein said first and second feedback signals are transmitted using different codes.

18. A method according to claim 15, wherein said first feedback signal defines a first weight determined on the basis of a channel estimate quantized to said first constellation, and said second feedback signal defines a second weight determined on the basis of a channel estimate quantized to said second constellation.

19. A method according to claim 18, wherein said second constellation is a rotated copy of said first constellation.

20. A method according to claim 18, wherein said second feedback signal is based on a rotated channel estimate quantized to said first constellation.

21. A method according to claim 15, wherein said first and second feedback signals are fed back in successive time slots.

22. A method according to claim 15, wherein said first feedback signal defines a real part of said weight information, and said second feedback signal defines an imaginary part of said weight information.

23. A method according to claim 22, wherein said first feedback signal is fed back during odd time slots, and second feedback signal is fed back during even time slots.

24. A method according to claim 15, wherein said first feedback signal defines a first feedback information to be used for updating a first beam of said transmitting element, and said second feedback signal defines a second feedback information to be used for updating a second beam of said transmitting element.

25. A method according to claim 15, wherein said first feedback signal defines a quadrant in a 4-PSK constellation, and said second feedback signal defines a constellation point within said quadrant defined by said first feedback signal.

26. A method according to claim 25, wherein said second feedback signal defines a differential change, a Gray-encoded sub-quadrant, or a combination thereof.

27. A transmit diversity method for a wireless communication system comprising a transmitting element and at least one receiver, said method comprising the steps of:
- a) transmitting from said transmitting element to said at least one receiver a transmission signal in accordance with a weight information determined in response to a feedback information;
- b) deriving said feedback information from the response at said at least one receiver to said transmission signal; and
- c) feeding back said feedback information using multiplexed feedback signals;
- wherein said multiplexed feedback signals are transmitted by at least two users having different signal constellations.

28. A method according to claim 27, wherein said at least two users comprise a first set of users controlling weights at a first antenna of said transmitting element, and a second set of users controlling weights at a second antenna of said transmitting element.

29. A transmit diversity method for a wireless communication system comprising a transmitting element and at least one receiver, said method comprising the steps of:
- a) transmitting from said transmitting element to said at least one receiver a transmission signal in accordance with a weight information determined in response to a feedback information;
- b) deriving said feedback information from the response at said at least one receiver to said transmission signal; and
- c) feeding back said feedback information using multiplexed feedback signals:
- wherein at least one of said weight information and a direction of transmission are determined on the basis of a feedback signal filtering operation and said weight information is determined by quantizing the filtered feedback information to a desired quantization constellation.

30. A method according to claim 29, wherein said desired constellation depends on an amplifier loading at said transmitting element.

31. A method according to claim 29, wherein said filtered feedback information comprises four constellation points and said quantization constellation comprises eight or sixteen constellation points.

32. A transmit diversity method for a wireless communication system comprising a transmitting element and at least one receiver, said method comprising the steps of:
- a) transmitting from said transmitting element to said at least one receiver a transmission signal in accordance with a weight information determined in response to a feedback information;
- b) deriving said feedback information from the response at said at least one receiver to said transmission signal; and
- c) feeding back said feedback information using multiplexed feedback signals;
- wherein at least one of said weight information and a direction of transmission are determined on the basis of a feedback signal filtering operation and the feedback signal filtering operation is performed by a filter of a length of N samples, wherein N is larger than the number of said multiplexed feedback signals.

33. A transmit diversity method for a wireless communication system comprising a transmitting element and at least one receiver, said method comprising the steps of:
- a) transmitting from said transmitting element to said at least one receiver a transmission signal in accordance with a weight information determined in response to a feedback information;
- b) deriving said feedback information from the response at said at least one receiver to said transmission signal; and
- c) feeding back said feedback information using multiplexed feedback signals;
- wherein at least one of said weight information and a direction of transmission are determined on the basis of a feedback signal filtering operation and said filtering operation comprises a robust filtering, a FIR filtering, an IIR filtering, a linear filtering, a non-linear filtering, or a smoothing and prediction.

34. A transmit diversity method for a wireless communication system comprising a transmitting element and at least one receiver, said method comprising the steps of:
- a) transmitting from said transmitting element to said at least one receiver a transmission signal in accordance with a weight information determined in response to a feedback information;
- b) deriving said feedback information from the response at said at least one receiver to said transmission signal; and
- c) feeding back said feedback information using multiplexed feedback signals;
- wherein said feedback information is fed back to said transmitting element by determining said weight information by filtering said feedback information and quantizing the filtered feedback information to a desired quantization constellation.

35. A method according to claim 34, wherein the quantization constellation at said at least one receiver has fewer states than that at said transmitting element.

36. A method according to claim 35, wherein said feedback information comprises four constellation points and said quantization constellation comprises eight or sixteen constellation points.

37. A method according to claim 34, wherein the feedback signal filtering operation is performed by a moving average filter.

38. A method according to claim 34, wherein the feedback signal filtering operation is applied to a sequence of previous feedback signals, and the weight information is calculated by an estimation using a trellis structure.

39. A method according to claim 38, wherein said estimation is performed by using a sequence estimator or MAP detector.

40. A transmit diversity system for a wireless communication system, comprising:
- a) transmitting means for transmitting a transmission signal from a transmitting element in accordance with a weight information determined in response to a filtered feedback information, wherein said weight information is determined by quantizing said filtered feedback information to a desired quantization constellation;
- b) at least one receiver for receiving said transmission signal and deriving said filtered feedback information from the response to said transmission signal;
- c) wherein said at least one receiver comprises feedback means for feeding back said filtered feedback information using multiplexed feedback signals.

41. A transmit diversity system for a wireless communication system, comprising:

a) transmitting means for transmitting a transmission signal from a transmitting element in accordance with a weight information determined in response to a feedback information;

b) at least one receiver for receiving said transmission signal and deriving said feedback information from the response to said transmission signal;

c) wherein said at least one receiver comprises feedback means for feeding back said feedback information using multiplexed feedback signals;

wherein said feedback means is arranged to generate a first feedback signal having a first constellation and a second feedback signal having a second constellation.

42. A transmit diversity system for a wireless communication system, comprising:

a) transmitting means for transmitting a transmission signal from a transmitting element in accordance with a weight information determined in response to a feedback information;

b) at least one receiver for receiving said transmission signal and deriving said feedback information from the response to said transmission signal;

c) wherein said at least one receiver comprises feedback means for feeding back said feedback information using multiplexed feedback signals;

wherein said feedback means is arranged to generate a first feedback signal having a first constellation and a second feedback signal having a second constellation;

wherein said first feedback signal defines a first phase weight determined on the basis of a channel estimate, and said second feedback signal defines a second phase weight determined on the basis of a rotated constellation of said first feedback signal.

43. A transmit diversity system for a wireless communication system, comprising:

a) transmitting means for transmitting a transmission signal from a transmitting element in accordance with a weight information determined in response to a feedback information;

b) at least one receiver for receiving said transmission signal and deriving said feedback information from the response to said transmission signal;

c) wherein said at least one receiver comprises feedback means for feeding back said feedback information using multiplexed feedback signals;

wherein said feedback means is arranged to generate a first feedback signal having a first constellation and a second feedback signal having a second constellation;

wherein said first feedback signal defines a real part of said weight information, and said second feedback signal defines an imaginary part of said weight information.

44. A system according to claim 43, wherein said feedback means is arranged to feedback said first feedback signal during odd time slots and said second feedback signal during even time slots.

45. A transmit diversity system for a wireless communication system, comprising:

a) transmitting means for transmitting a transmission signal from a transmitting element in accordance with a weight information determined in response to a feedback information;

b) at least one receiver for receiving said transmission signal and deriving said feedback information from the response to said transmission signal;

c) wherein said at least one receiver comprises feedback means for feeding back said feedback information using multiplexed feedback signals;

wherein said feedback means is arranged to generate a first feedback signal having a first constellation and a second feedback signal having a second constellation;

wherein said first feedback signal defines a first feedback information to be used by said transmitting means for updating a first beam of said transmitting element, and said second feedback signal defines a second feedback information to be used by said transmitting means for updating a second beam of said transmitting element.

46. A transmitter for a wireless communication system, comprising:

a) extracting means for extracting a feedback information from a received signal;

b) transmitting means for transmitting a transmission signal from a transmitting element in accordance with a weight information;

c) determining means for determining said weight information in response to said extracted feedback information, wherein said weight information is determined by quantizing said extracted feedback information to a desired quantization constellation; and d) control means for controlling said determining means so as to determine said weight information in accordance with multiplexed feedback signals used for feeding back said feedback information.

47. A transmitter according to claim 46, wherein said transmitting element is an antenna array.

48. A transmitter according to claim 46, wherein said control means is arranged to perform a feedback signal filtering operation.

49. A transmitter for a wireless communication system, comprising:

a) extracting means for extracting a feedback information from a received signal;

b) transmitting means for transmitting a transmission signal from a transmitting element in accordance with a weight information;

c) determining means for determining said weight information in response to said extracted feedback information; and d) control means for controlling said determining means so as to determine said weight information in accordance with multiplexed feedback signals used for feeding back said feedback information;

wherein said control means comprises a switching means for alternately switching a first feedback signal having a first constellation and a second feedback signal having a second constellation to said determining means.

50. A transmitter according to claim 49, wherein said determining means is arranged to derive said weight information from said first and second feedback signals.

51. A transmitter according to claim 49, wherein said control means is arranged to control said transmitting means is arranged to control said transmitting means so as to alternately update a first beam of said transmitting element by using a first weight information determined on the basis of said first feedback signal, and a second beam of said transmitting element by using a second weight information determined on the basis of said second feedback signal.

52. A transmitter for a wireless communication system, comprising:

a) extracting means for extracting a feedback information from a received signal;

b) transmitting means for transmitting a transmission signal from a transmitting element in accordance with a weight information;

c) determining means for determining said weight information in response to said extracted feedback information; and d) control means for controlling said determining means so as to determine said weight information in accordance with multiplexed feedback signals used for feeding back said feedback information;

wherein said control means is arranged to perform a feedback signal filtering operation and to quantize the filtered feedback information to a desired quantization constellation.

53. A transmitter for a wireless communication system, comprising:

a) extracting means for extracting a feedback information from a received signal;

b) transmitting means for transmitting a transmission signal from a transmitting element in accordance with a weight information;

c) determining means for determining said weight information in response to said extracted feedback information; and d) control means for controlling said determining means so as to determine said weight information in accordance with multiplexed feedback signals used for feeding back said feedback information;

wherein said control means is arranged to perform a feedback signal filtering operation and comprises a moving average filter for performing the feedback signal filtering operation.

54. A transmitter for a wireless communication system, comprising:

a) extracting means for extracting a feedback information from a received signal;

b) transmitting means for transmitting a transmission signal from a transmitting element in accordance with a weight information;

c) determining means for determining said weight information in response to said extracted feedback information; and d) control means for controlling said determining means so as to determine said weight information in accordance with multiplexed feedback signals used for feeding back said feedback information;

wherein said control means is arranged to perform a feedback signal filtering operation and said filtering operation comprises a robust filtering, a FIR filtering, an IIR filtering, a linear filtering, a non-linear filtering, or a smoothing and prediction.

55. A transmitter for a wireless communication system, comprising:

a) extracting means for extracting a feedback information from a received signal;

b) transmitting means for transmitting a transmission signal from a transmitting element in accordance with a weight information;

c) determining means for determining said weight information in response to said extracted feedback information; and d) control means for controlling said determining means so as to determine said weight information in accordance with multiplexed feedback signals used for feeding back said feedback information;

wherein control means are configured for filtering said extracted feedback information, and for quantizing the filtered feedback information to a desired quantization constellation.

56. A transmitter according to claim 55, wherein said control means comprises a moving average filter for performing the feedback signal filtering operation.

57. A receiver for a wireless communication system, comprising:

a) receiving means for receiving a transmission signal;

b) deriving means for deriving a feedback information from the response to said transmission signal; and c) feedback means for feeding back said feedback information using multiplexed feedback signals, wherein said deriving means comprises extracting means for extracting a probing signal transmitted with a known power, channel estimation means for performing a channel estimation on the basis of said extracted probing, signal, and generating means for generating said multiplexed feedback signals on the basis of said channel estimation.

58. A receiver for a wireless communication system, comprising:

a) receiving means for receiving a transmission signal;

b) deriving means for deriving a feedback information from the response to said transmission signal; and c) feedback means for feeding back said feedback information using multiplexed feedback signals, wherein said deriving means comprises extracting means for extracting a probing signal transmitted with a known power, channel estimation means for performing a channel estimation on the basis of said extracted probing, signal, and generating means for generating said multiplexed feedback signals on the basis of said channel estimation, wherein said generating means is arranged to generate a first feedback signal having a first constellation and a second feedback signal having a second constellation, wherein said feedback means is arranged to feedback said first and second feedback signals as said multiplexed feedback signals.

59. A receiver according to claim 58, wherein said feedback means is arranged to alternately feedback said first and second feedback signals, wherein a quantization of the feedback information is based on the latest channel estimate and an available one of said first and second constellation.

60. A receiver according to claim 58, wherein said generating means is arranged to generate said first feedback signal based on said channel estimation and said second feedback signal based on a rotation of said channel estimation by a predetermined angle.

61. A receiver according to claim 58, wherein said generating means is arranged to generate said first feedback signal based on a real part of said feedback information, and said second feedback signal based on an imaginary part of said feedback information.

62. A receiver according to claim 58, wherein said extracting means is arranged to alternately extract a probing signal corresponding to a first beam and a probing signal corresponding to a second beam, and said generating means is arranged to alternately generate said first feedback signal based on a channel estimate for said first beam, and said second feedback signal based on a channel estimate for said second beam.

* * * * *